United States Patent [19]

Kawamura et al.

[11] Patent Number: 4,713,684
[45] Date of Patent: Dec. 15, 1987

[54] IMAGE PROCESSING APPARATUS FOR DISCRIMINATING AND PROCESSING DIFFERENT FORMATS OF COLOR IMAGE SIGNALS

[75] Inventors: Naoto Kawamura, Yokohama; Shunichi Abe, Kawasaki, both of Japan

[73] Assignee: Canon Kabushiki Kaisha, Tokyo, Japan

[21] Appl. No.: 39,762

[22] Filed: Apr. 17, 1987

Related U.S. Application Data

[63] Continuation of Ser. No. 586,070, Mar. 5, 1984, abandoned.

[30] Foreign Application Priority Data

Mar. 8, 1983 [JP] Japan .................... 58-37707

[51] Int. Cl.⁴ .............. H04N 1/46; H04N 1/32; H04N 1/40
[52] U.S. Cl. ........................ 358/78; 358/75; 358/257; 358/258; 358/280
[58] Field of Search .............. 358/75, 75 IJ, 78, 80, 358/280, 283, 298, 257, 258

[56] References Cited

U.S. PATENT DOCUMENTS

| 1,817,098 | 8/1931 | Ranger et al. ............ 358/75 IJ |
| 2,185,806 | 1/1940 | Finch ........................... 358/75 |
| 4,274,114 | 6/1981 | Kozima ....................... 358/257 |
| 4,320,419 | 3/1982 | Cottriall ...................... 358/258 |
| 4,383,277 | 5/1983 | Kubo .......................... 358/280 |
| 4,384,307 | 5/1983 | Kuzmik et al. ............. 358/257 |
| 4,496,989 | 1/1985 | Hirosawa .................... 358/280 |
| 4,553,172 | 11/1985 | Yamada et al. .............. 358/75 |

FOREIGN PATENT DOCUMENTS

| 102825 | 8/1979 | Japan ..................... 358/75 |
| 17573 | 2/1981 | Japan ................... 358/257 |
| 1377 | 1/1983 | Japan ..................... 358/75 |
| 198955 | 11/1983 | Japan ................... 358/257 |
| 2102240 | 1/1983 | United Kingdom ........ 358/75 |

Primary Examiner—James J. Groody
Assistant Examiner—Randall S. Svihla
Attorney, Agent, or Firm—Fitzpatrick, Cella, Harper & Scinto

[57] ABSTRACT

Data processing apparatus include an input device that has a single signal line. The input device inputs a data signal and a discrimination signal through the signal line with the data signal having one of a plurality of data formats in each of which a plurality of kinds of data are arranged during respectively different periods of the data signal. The discrimination signal represents the one of the formats in which the data signal is arranged. A discriminator, connected to the single signal line, is responsive to the discrimination signal to discriminate the format of the data signal input by the input device. A separation circuit is responsive to the discrimination by the discriminator to respectively separate the plurality of kinds of data from the data signal in accordance with the format of the data signal. The different kinds of data carried by the data signal may include different color component data. Further, the formats in which the data signal may be arranged include an arrangement of the different kinds of data in pixel units, an arrangement of such data in line units, and an arrangement of such data in frame units.

19 Claims, 24 Drawing Figures

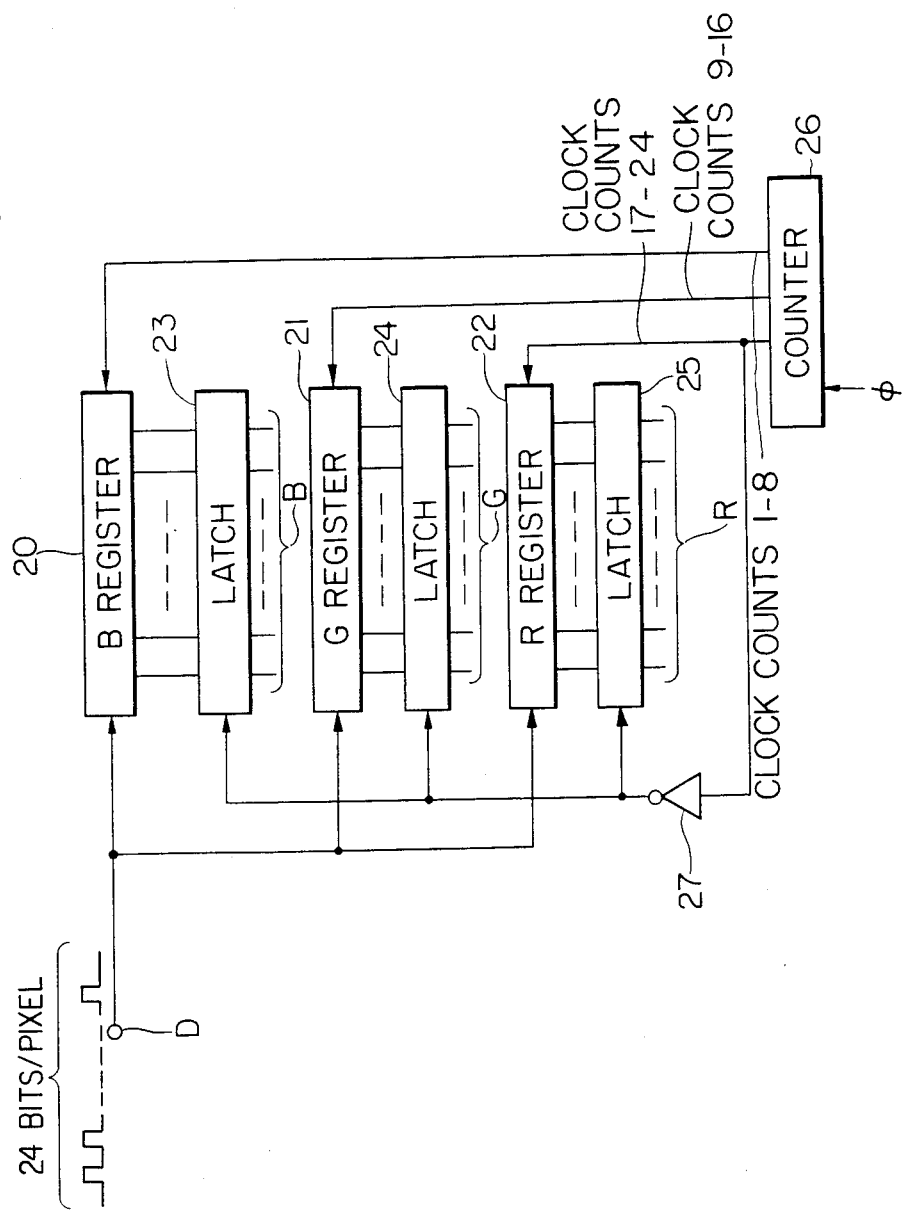

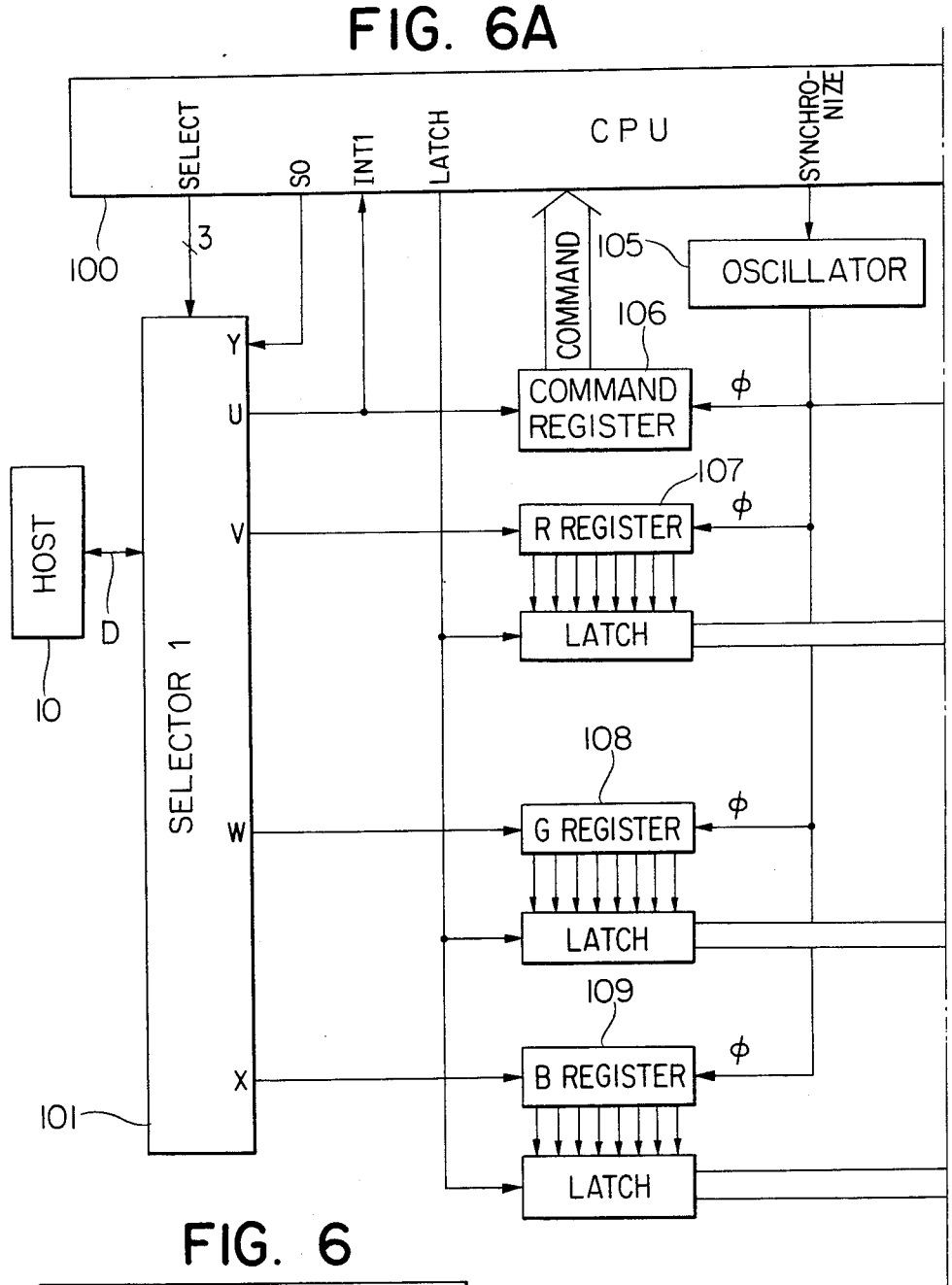

- STEP 1: SELECT U
- STEP 2: INPUT DATA IN INT1? — NO → loop back; YES ↓
- STEP 3: OUTPUT SYNCHRONIZING SIGNAL
- STEP 4: $\phi = 8$? — NO → loop; YES ↓
- STEP 5: INPUT COMMAND
- STEP 6: UPPER 3 BITS = 111? — NO → loop back; YES ↓
- STEP 7: CHECK LOWER 5 BITS
- STEP 8: $\phi = 16$? — NO → loop; YES ↓
- STEP 9: INPUT M (NUMBER OF LINES)
- STEP 10: $\phi = 24$? — NO → loop; YES ↓
- STEP 11: INPUT N (NUMBER OF PIXELS)

(B)

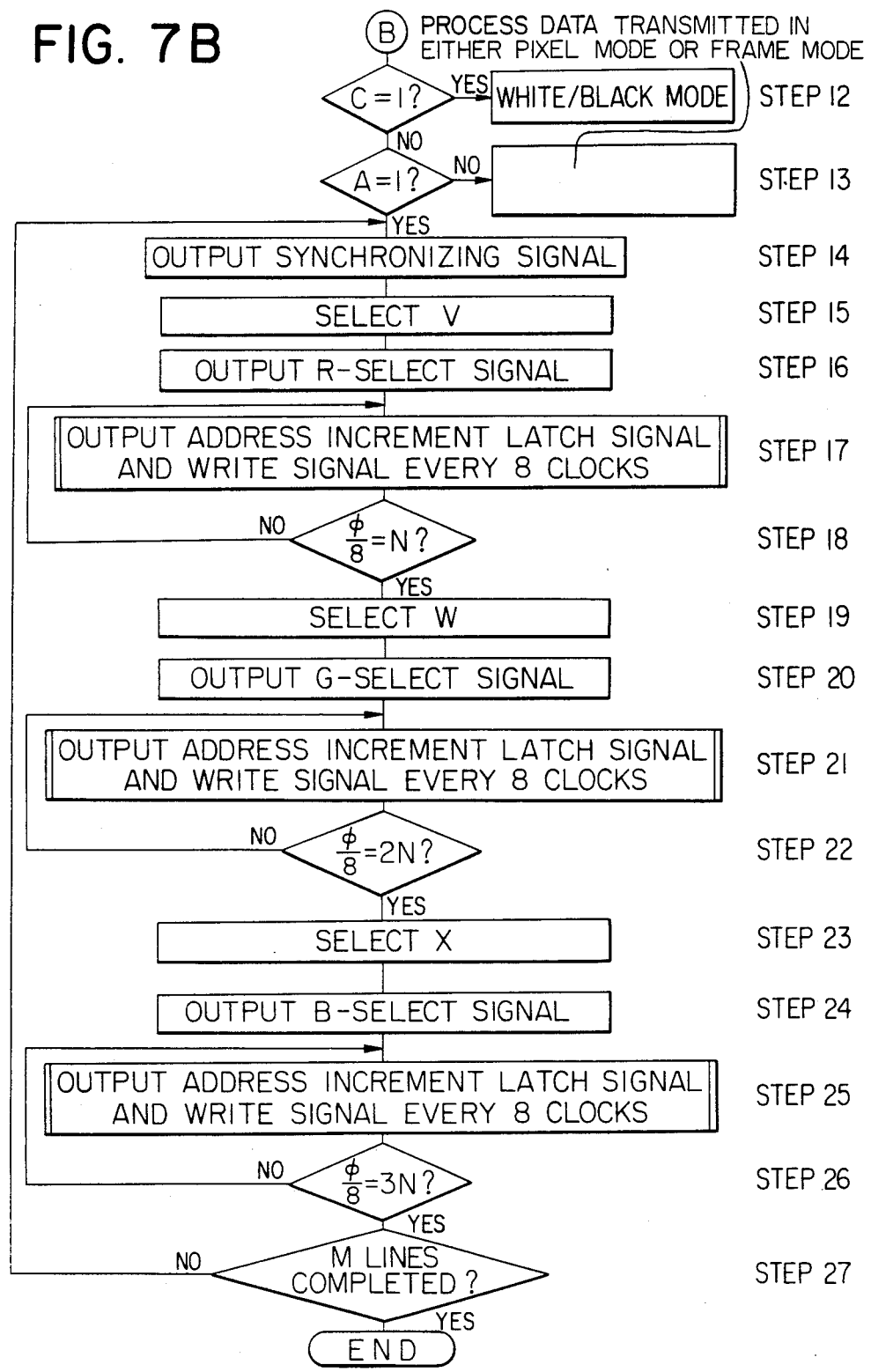

| FIG. 10A | FIG. 10B |

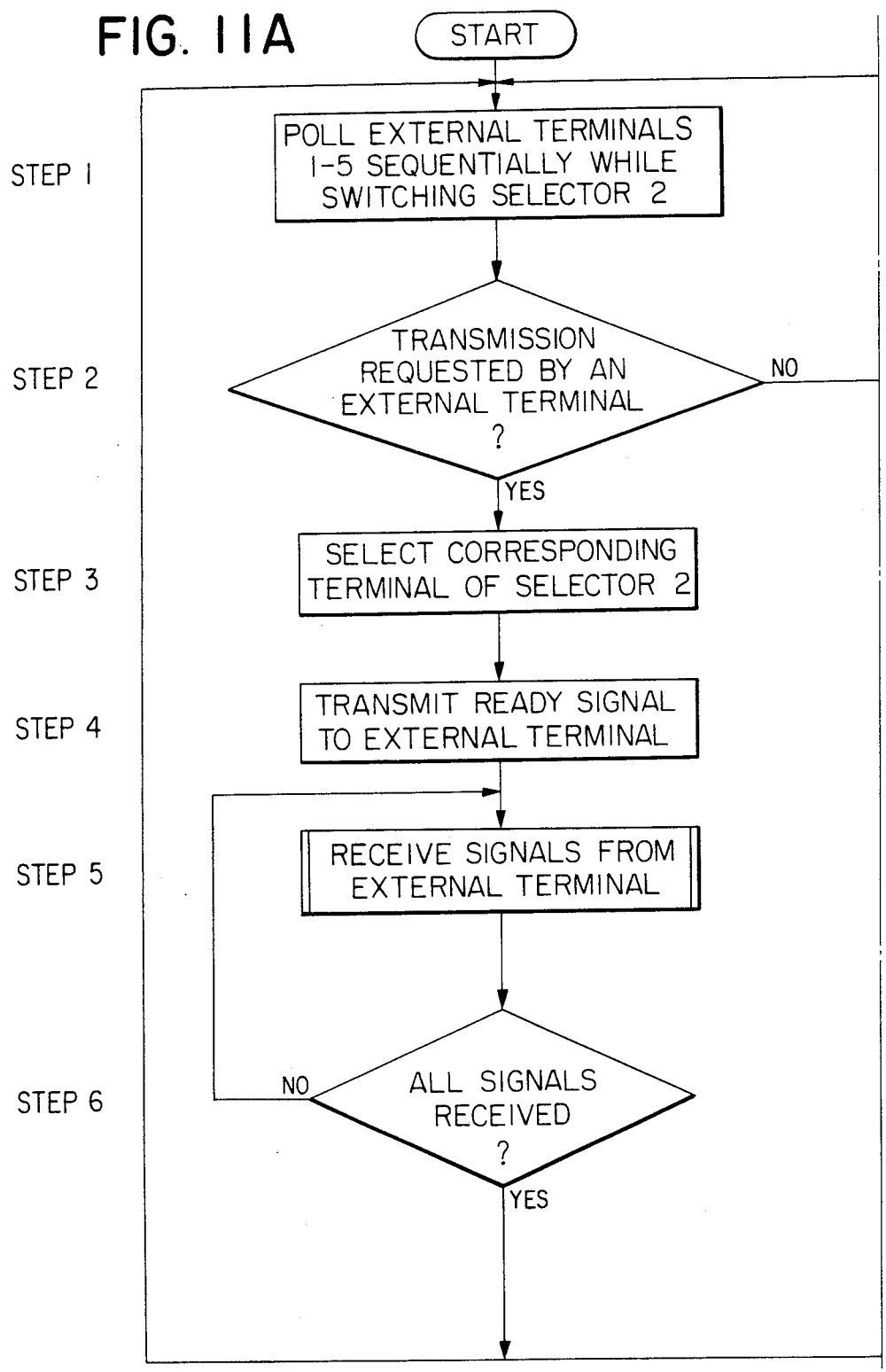

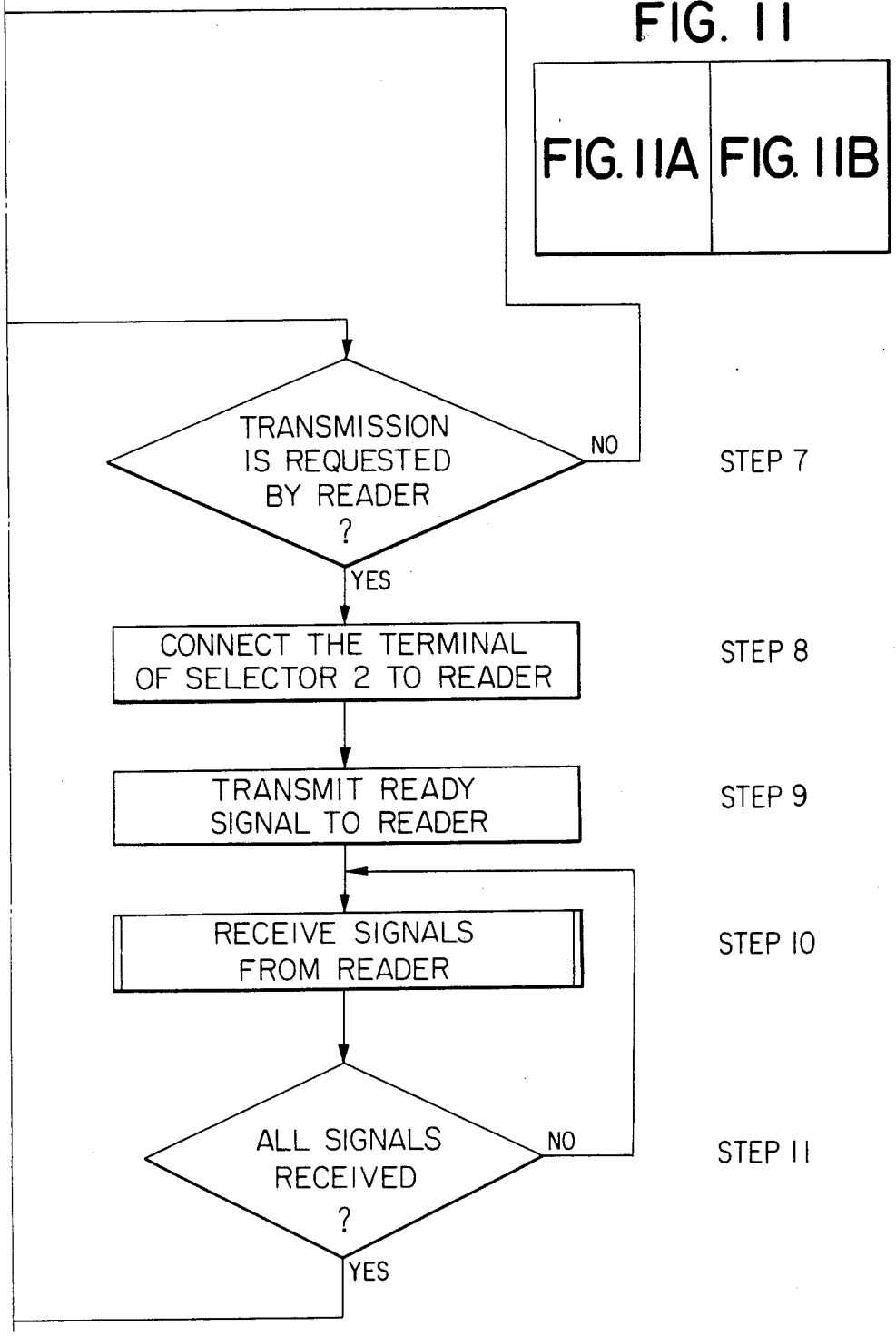

4,713,684

IMAGE PROCESSING APPARATUS FOR DISCRIMINATING AND PROCESSING DIFFERENT FORMATS OF COLOR IMAGE SIGNALS

This application is a continuation of application Ser. No. 586,070 filed 3/5/84, now abandoned.

BACKGROUND OF THE INVENTION

1. Field of the Invention

The present invention relates to an image data processing system such as a digital color copying system.

2. Description of the Prior Art

In a digital color copying machine, color signals read from a document by a CCD are transmitted to a signal processing circuit through respective signal lines, where they are processed by $\gamma$-correction (tone correction) or masking (color correction) to reproduce a full-color image. However, when the CCD and the image reproducing unit are distant from each other, a number of long signal lines for the respective colors are required, and the wiring of such signal lines increases the cost. It is difficult to reproduce a full-color image by transmitting the analog color signals from the CCD to a distant place through a telephone line.

SUMMARY OF THE INVENTION

It is an object of the present invention to provide an image data processing system which can transmit image data through a small number of transmission lines irrespective of the type of image data to be processed and which can process the image data.

It is another object of the present invention to provide an image data processing system which can reproduce an image from a serial input of image signals to be concurrently processed.

It is another object of the present invention to provide an image data processing system which can reproduce a color image by concurrently processing color data for a serial input of digital color signals.

It is another object of the present invention to provide an image data processing system which separates data from a serial image signal including a repetition of various image data, processes and combines the separated data to reproduce an image.

It is another object of the present invention to provide an image data processing system which separates basic color data from a serial digital color signal which is a repetition of the basic color data and outputs the separated data in parallel.

It is another object of the present invention to provide a color image data processing system which separates color signals from a digital color signal input and stores the separated signals in respective memories.

It is another object of the present invention to provide a color image data processing system having a network for transmitting digital color signals.

It is another object of the present invention to provide a color image data processing system which can receive proper color signals independently of the type of transmission and outputs the received signals.

It is another object of the present invention to provide an image data processing system which can process image data for image data inputs from a document image reader and an external terminal device.

It is another object of the present invention to provide an image data processing system which separates color signals transmitted time-serially through one signal line, arranges the separated signals in parallel as dot color signals, and processes the signals to reproduce a color image, or simultaneously and in parallel masks the color signals or performs under color removal to produce the output in real-time, or stores the signals in respective color page memories.

The above and other objects of the present invention will be apparent from the following description of the invention.

BRIEF DESCRIPTION OF THE DRAWINGS

FIG. 4 is a circuit diagram of a separator 1 shown in FIG. 1, FIGS. 5A–5F show a signal format, FIG. 7 shows how FIGS. 7A and 7B form a control flow chart for controlling the system by a control code, FIG. 11 shows how FIGS. 11A and 11B form a control flow chart for receiving data.

DETAILED DESCRIPTION OF THE PREFERRED EMBODIMENTS

In the following description, B, G, R, Y, M, C and BK represent blue, green, red, yellow, magenta, cyan and black, respectively.

Figure 1:
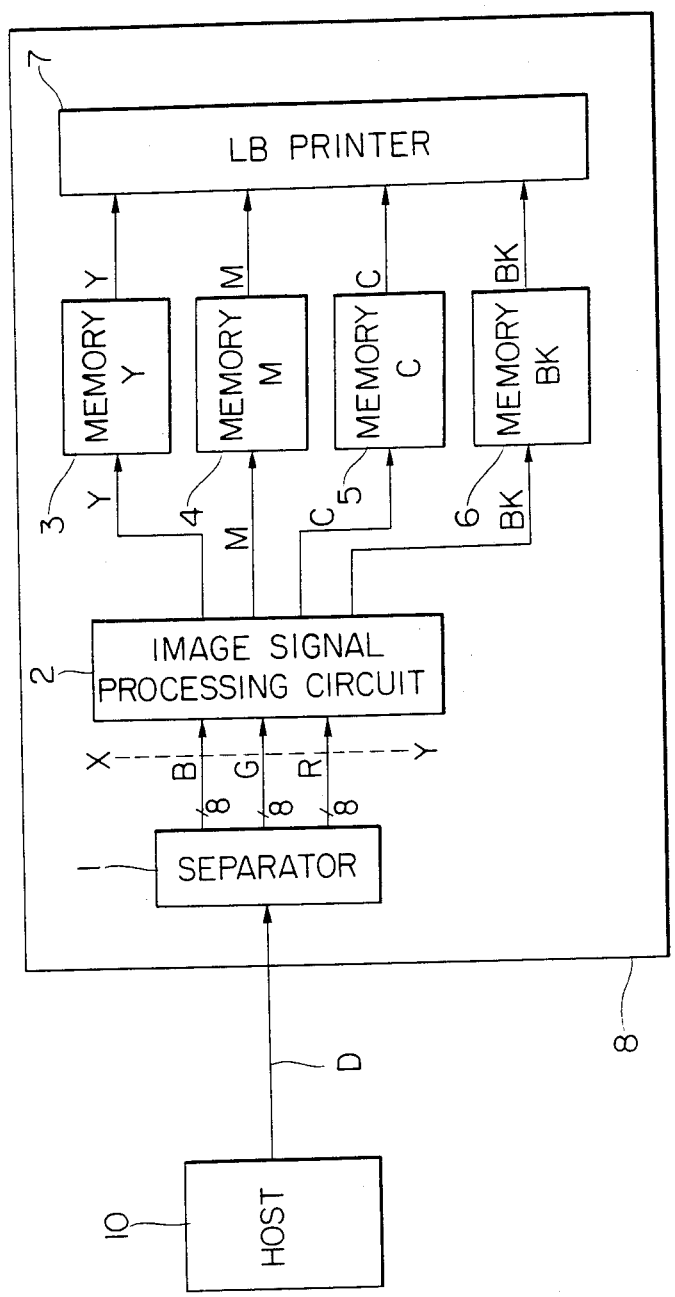
FIG. 1 is a block diagram of a color image processing system of the present invention.

FIG. 1 shows one embodiment of the present invention.

Numeral 1 denotes a separator, numeral 2 denotes an image signal processing circuit such as a masking circuit, numerals 3, 4, 5 and 6 denote memories Y, M, C and BK, respectively, for storing signals Y, M, C and BK supplied from the processing circuit 2, numeral 7 denotes a four-drum laser beam printer which forms images of Y, M, C and BK on respective drums and sequentially transfers the images onto paper with color registration, numeral 8 denotes a digital color printer including elements 1–7, and numeral 10 denotes a host computer. The printer 7 need not be the four-drum printer.

Figure 2:
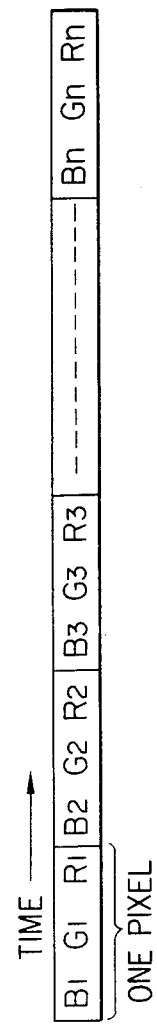
FIGS. 2 and 3 show signal formats.

As shown in FIG. 2, a blue image signal $B_1$ in one pixel is first sent out from the host 10, then a green image signal $G_1$ is sent out, next a red image signal $R_1$ is sent out, then a blue image signal $B_2$ in the next pixel is sent out, next a green image signal $G_2$ is sent out and next a red image signal $R_2$ is sent out, in time-serial fashion through a telephone line. The B, G and R signals in one pixel may be the same point or three points B, G and R may form one pixel.

Figure 3:
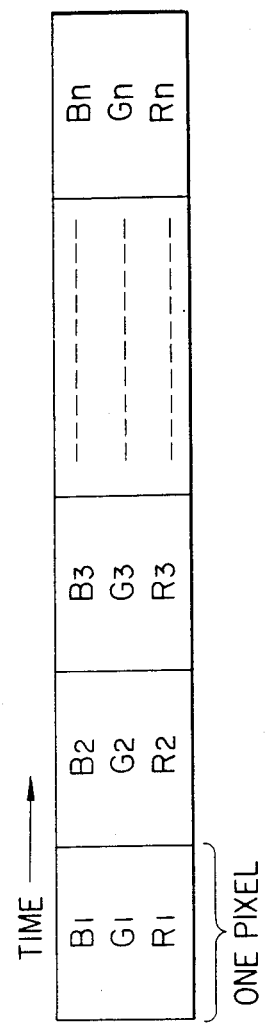

When the digital color printer 8 receives the transmitted signals, it rearranges the serial signals by means of the separator 1 for each pixel as shown in FIG. 3, separates them to B, G and R, transfer them to the image signal processing circuit 2 where well known UCR (under color removed) processing or masking is carried out, and stores the processing data respectively in the memory (Y) 3, the memory (M) 4, the memory (C) 5 and the memory (BK) 6. The respective color images are formed on the drums of the four-drum laser beam printer 7 and the respective color images are transferred to one paper with colors in registration. The separator 1 functions to process one-bit data transmitted in series from the host as described below.

FIG. 4 shows a circuit diagram of the separator 1. The signals B, G and R each have 8-bit tone data. Thus, the data D is the digital signal comprising 24 ($=3\times8$) bits per pixel. Numerals 20–22 denote 8-bit registers which store B, G and R data, respectively. Numerals 23–25 denote 8-bit latches for transferring the data from the registers to the processing circuit 2, numeral 26 denotes a counter which controls the registers and the latches and counts a clock signal $\phi$ which is of the same rate as the transmission rate of the data D, and numeral 27 denotes an inverter which causes the latches to produce the outputs at falling of the 24th bit signal of the counter 26.

The B-register 20 stores the data D by the counts 1–8 of the counter 26 so that 8-bit data of the B-signal in the data D is stored. The next G-signal is registered in the G-register 21 by the counts 9–16, and the next R-signal is stored in the R-register 22 by the counts 17–24. As the data are stored in the respective registers, the respective 8-bit color data are latched in the latches 23–25. When 24 bits have been stored, that is, in response to the fall of the pulse at the count 24 of the counter, the latches 23–25 simultaneously and in parallel output the B, G and R data. The counter then repeats the counts 1–24 so that the B, G and R data for the next pixel are stored in the respective registers. This operation is repeated so that the B, G and R data are simultaneously output in parallel for each pixel and the $\gamma$-correction, masking and UCR processing are carried out for the B, G and R outputs by the processing circuit 2. The signals are converted to the Y, M, C and BK signals which are then dither processed to reproduce tonality. They can be stored in the memories 3–6 or outputted to a printer.

The counter 26 is reset by command signals inserted at the beginning of the B, G and R data transmitted in a manner shown in FIG. 2, and starts to count. Since the latches simultaneously output the contents only at the fall of the 24th count pulse of the counter 26, any error in the processing circuit 2 is small. If a four-dot per pixel type printer which can simultaneously print Y, M, C and BK is used, the memories 3–6 are not necessary. The order of the masking and the UCR processing is arbitrary, and BK is determined by a minimum level of Y, M and C or a maximum level of B, G and R.

Figure 5A:
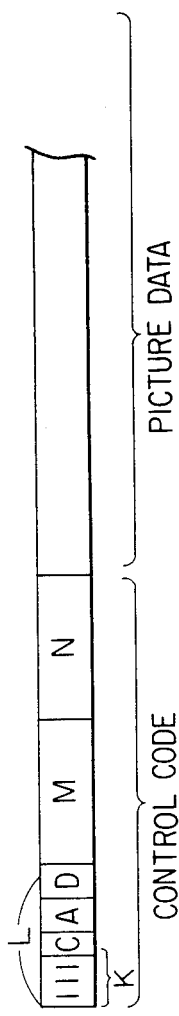
Figure 5B:
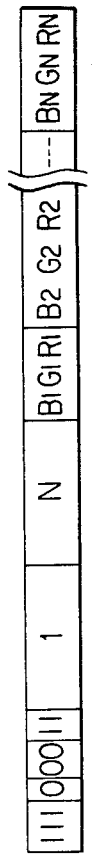
Figure 5C:
Figure 5D:
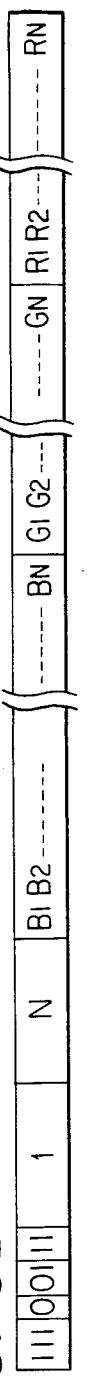
Figure 5E:
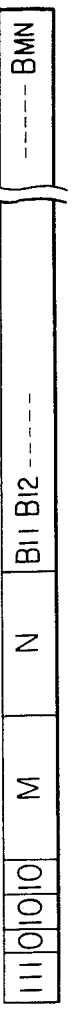
Figure 5F:

A data transmission format is now explained. FIGS. 5A–5F show signal formats similar to those of FIGS. 2 and 3. As described above, the command data (control code) is added to the color data. In FIG. 5A, the control code includes a control signal (L) and information on the number of lines (M) and the number of pixels (N). The control signal (L) includes a data format (A), a color signal (D), a black monochromatic signal (C), and a start signal (K). The start signal (K) is "111" in the present embodiment. The black monochromatic signal (C) is "1" for black. The data format (A) is "00" when the unit of data transmission is a pixel, "01" when the unit is a line, and "10" when the unit is a frame. The color signal D is "00" for R, "01" for G, "10" for B and "11" for RGB. The number of lines (M) indicates the number of lines of the data to be transmitted and the number of pixels (N) indicates the number of pixels per line of the data to be transmitted. In FIG. 5B, the data format (A) specifies the unit of a pixel and the color signal (D) specifies the RGB mode and the data is transmitted at a rate of N pixels per line. FIG. 5C shows a transmission format in which the B(blue) signal is transmitted one line at a time at a rate of N pixels per line. FIG. 5D shows a transmission format in which the RGB signal is transmitted one line at a time at a rate of N pixels per line. FIG. 5E shows a transmission format in which the B signal is transmitted frame by frame by M lines (M lines per frame, N pixels per line). FIG. 5F shows a transmission format in which the RGB signal is transmitted in the same manner as FIG. 5E. An end of transmission signal may be added. Prior to the start of transmission, the host inquires READY/BUSY to the terminal of the selector 1, and if it is READY, the transmission is started.

Figure 6B:
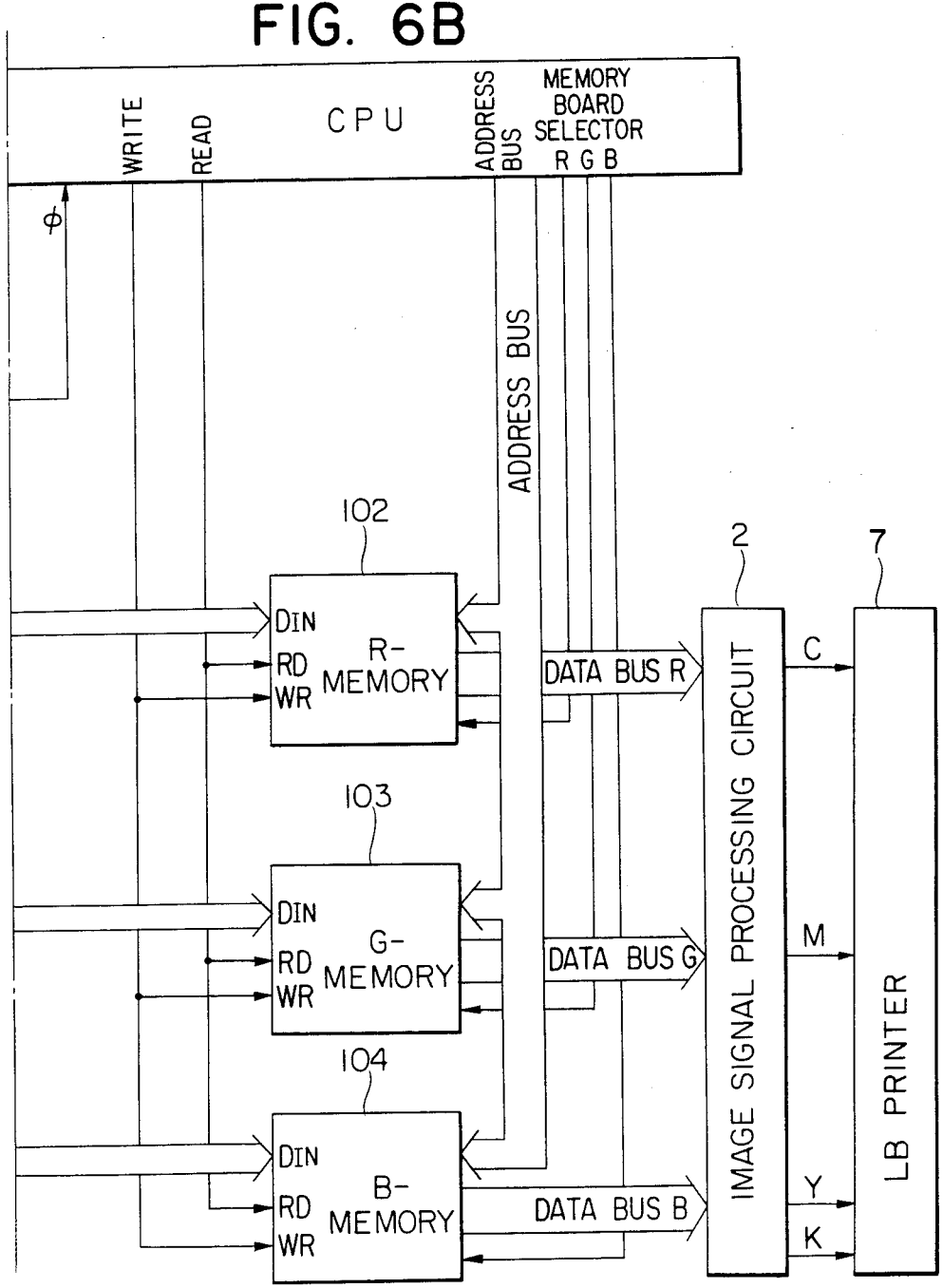
FIG. 6 shows how FIGS. 6A and 6B form a block diagram of another embodiment of the color image processing system of the present invention.

FIGS. 6A and 6B show a block diagram of a color data processing system which can process various transmission formats partly shown in FIGS. 5A–5F. FIGS. 7A and 7B show a control flow chart for a CPU 100 which discriminates the control code shown in FIGS. 5A–5F to write or read data in or from memories 102, 103 and 104 of FIG. 6B. If the terminal is READY, the CPU 100 selects the selector 1 (101) of FIG. 6A in a step 1 in FIG. 7A, and when it receives data, it is supplied to an INT1 in a step 2, and an oscillator 105 is started in a step 3 to produce a synchronizing signal. The received data is also supplied to a command register 106. In a step 4, when eight clock pulses have been counted, the CPU 100 reads in the 8-bit data stored in the command register, in a step 5.

If the high order three bits of the input command data are "111", the CPU determines that it is a start signal. Then the CPU checks the lower order five bits of the command data to discriminate the control signal including the data format (A), the color signal (D) and the black monochromatic signal (C), in a step 7.

In steps 8–11, the CPU discriminates the number of lines (M) and the number of pixels (N). In steps 12 and 13, the CPU determines whether the monochromatic mode is to be selected and whether the data unit is a line, a pixel or a frame. In steps 14 and thereafter, the line-by-line transmission is explained.

In a step 14, the oscillator 105 is again started to generate the synchronizing signal. In a step 15, the CPU 100 selects the selector 101 of FIG. 6A and a port V. In steps 16–18, the CPU reads in an 8-bit R-signal into an R-register 107 through the port V of the selector 101 and selects an R-memory 102, and in a step 17, the CPU writes in parallel the R-signal into the R-memory 102 by a WRITE signal from the CPU 100. These steps are continued until the transmission of the predetermined number of lines is detected in a step 18.

In steps 19–22, the G-data is written in parallel into a G-memory 103 from a G-register 108 through a port W of the selector 101.

Similarly, in steps 23–26, the B-data is written in parallel into a B-memory 104 from a B-register 109 through a port X of the selector 101.

In a step 27, if the above steps have been completed for the M lines, the process is terminated.

An output unit (printer) 7 and the image processing unit 2 of FIG. 6B are not explained here.

Figure 8:
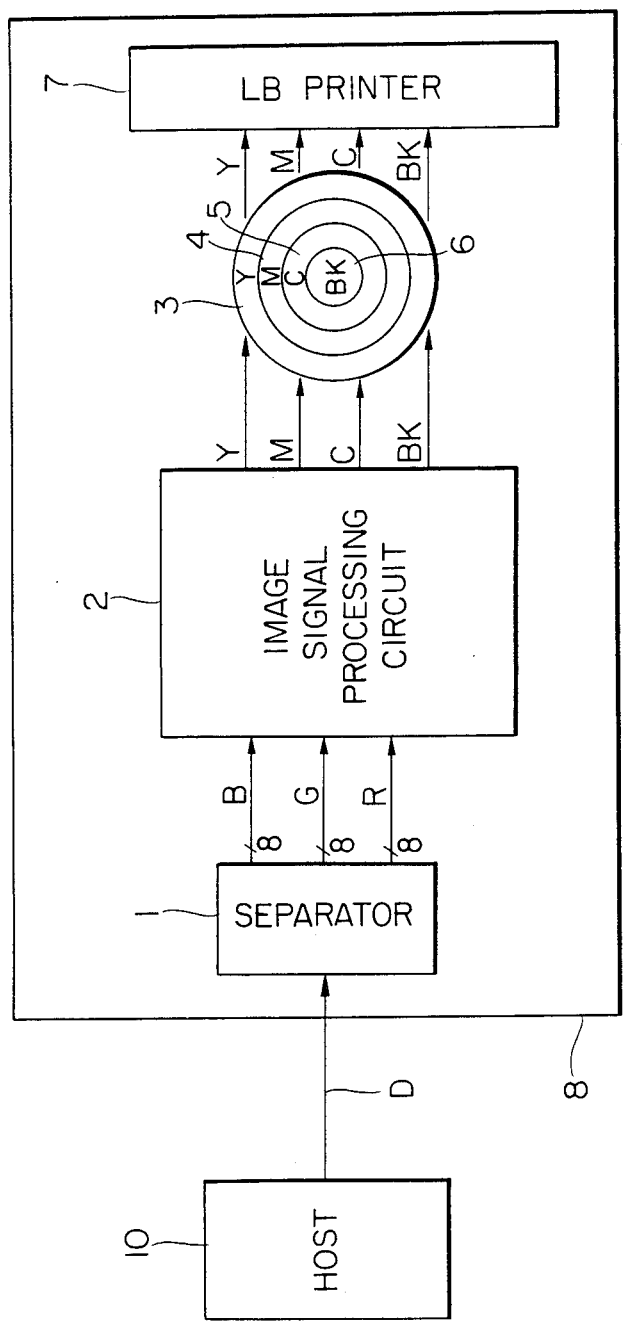
FIG. 8 shows another embodiment.

FIG. 8 shows another embodiment in which the memory (Y) 3, the memory (M) 4, the memory (C) 5 and the memory (BK) 6 of FIG. 1 are replaced by an optical disk or opto-magnetic disk 3. Since the optical disk is demountable from other apparatus, the received color data can be reproduced by a digital color printer to semi-permanently store it.

Figure 9:
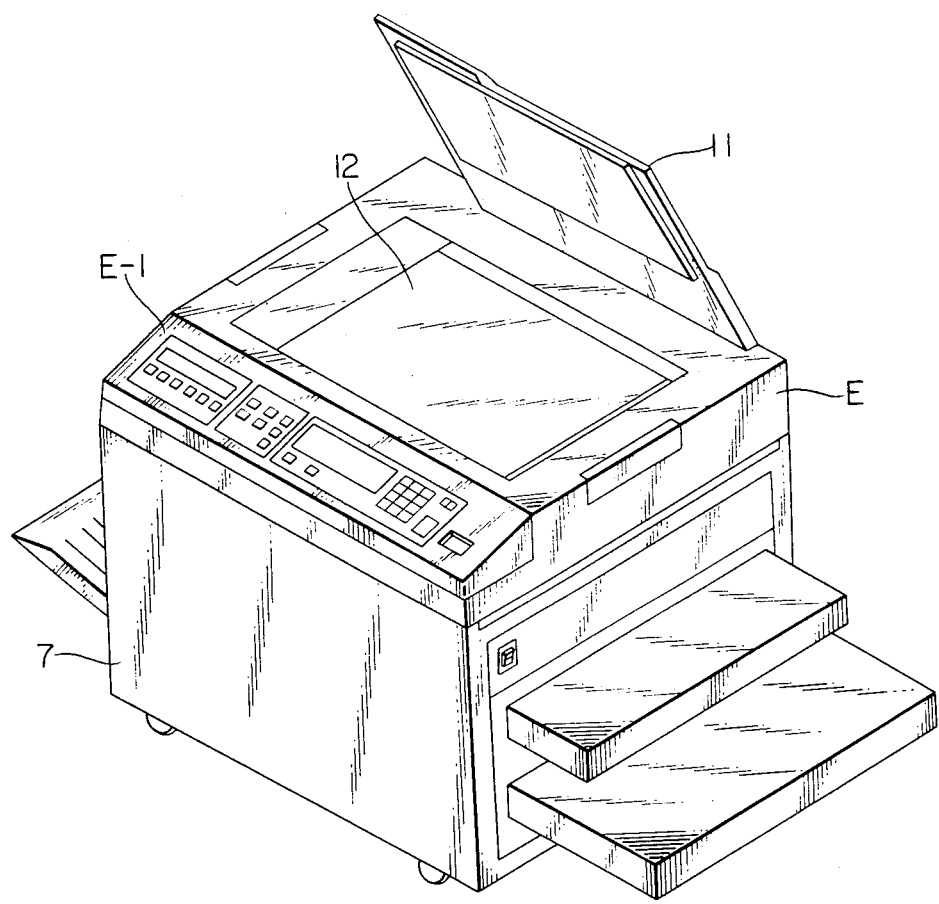
FIG. 9 shows an external view of a color data processing system.

A CCD color reader may be connected to the X-Y junction in FIG. 1 to input B, G and R signals. In this case, the processing speed of the processing circuit 2 should match with the output speed of the reader. FIG. 9 shows an external view of a color data processing system to which the reader and the printer 7 are connected. E denotes the reader, E-1 denotes a control panel for the reader, numeral 11 denotes an original sheet cover and numeral 12 denotes an original sheet platform. The control panel E-1 has keys for storing the data in the memory or editing the data.

The reader need not be arranged at the X-Y junction of FIG. 1 but may be arranged near the separator, as is the host. In this case, the data from the reader is serially supplied to the printer 8 as is the signal from the host. Such a system may also be constructed by the reader and printer shown in FIG. 9.

The technique of serial image data separation and parallel image processing can be applied to the following case.

A series of image data sent from the host 10 of FIG. 1 may include an MH (modified Huffman) code data having a document image compressed and encoded by an MH (modified Huffman) encoder and an ASCII code data having management data such as data and time data encoded by an ASCII encoder. By repeatedly and periodically transmitting those data for each line or frame, two types of code data can be transmitted through one data line. Those code data can be separated by the register and the counter described above. The separated MH code data is supplied to an MH decoder where it is converted to the document image data or bit image data (one bit per dot), and the ASCII code data is supplied to a character generator where it is converted to the management image data such as date or time numerals or characters, that is, the bit image data.

Of the parallel converted dot image data, the document image data is further processed for half-tone processing such as dither processing and then printed out. The management image data is displayed on a display of the system of FIG. 9 which can receive the data from the host.

The parallel converted bit image data may be combined and printed out on one sheet. Since the management data is periodically sent between frames of the document image data, the management data such as date, page and transmission fee can be printed out near a bottom corner of the sheet when one frame is printed out on one sheet. To this end, a memory for storing the bit image data converted from the ASCII code is provided, and the data in the memory is read out around the end of print of the document image.

The above technique can also be applied to terminal selection and polling.

Figures 10, 10A:
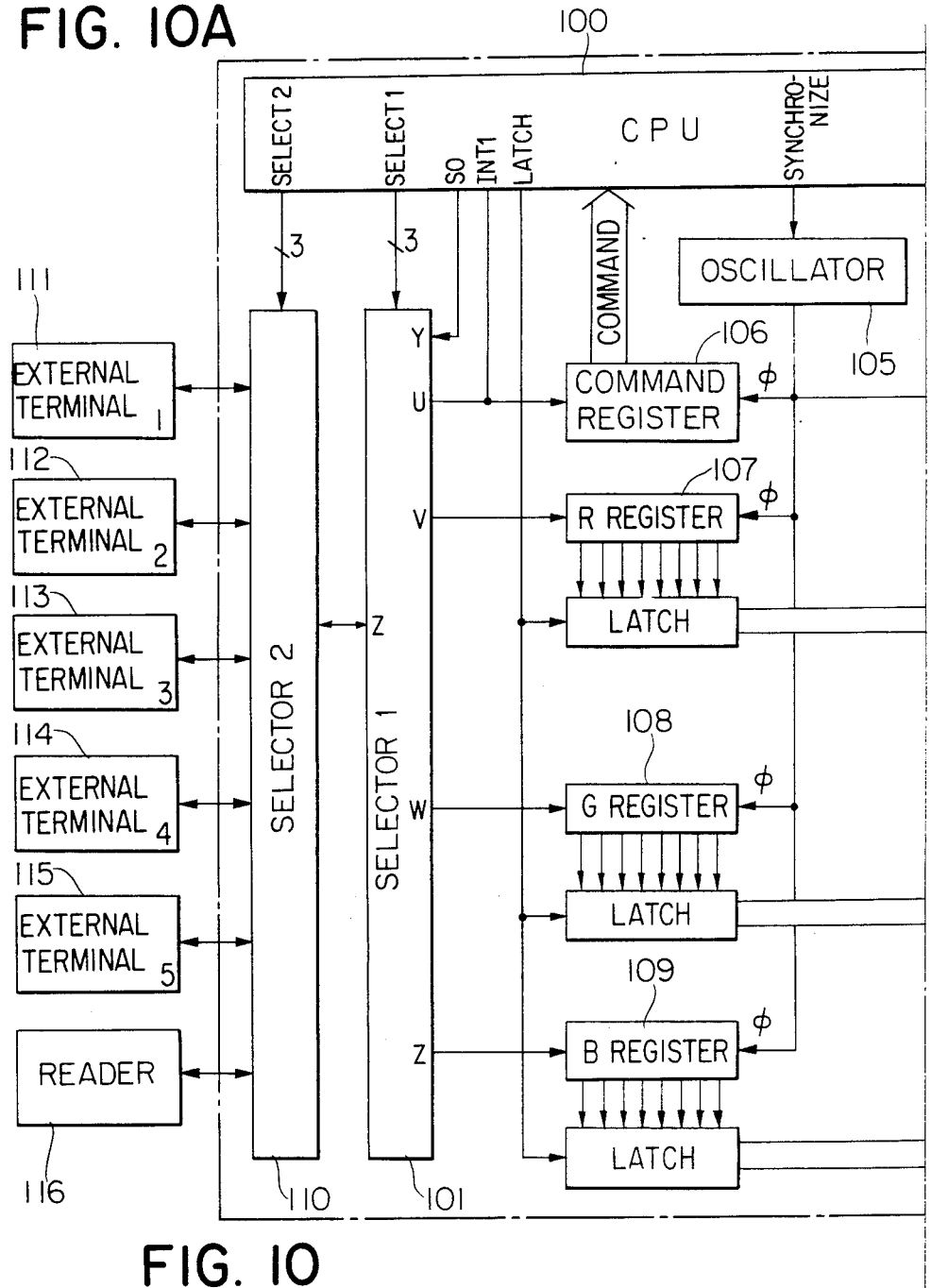
FIG. 10 shows how FIGS. 10A and 10B form a block diagram of another embodiment of the color image processing system of the present invention.
Figure 10B:
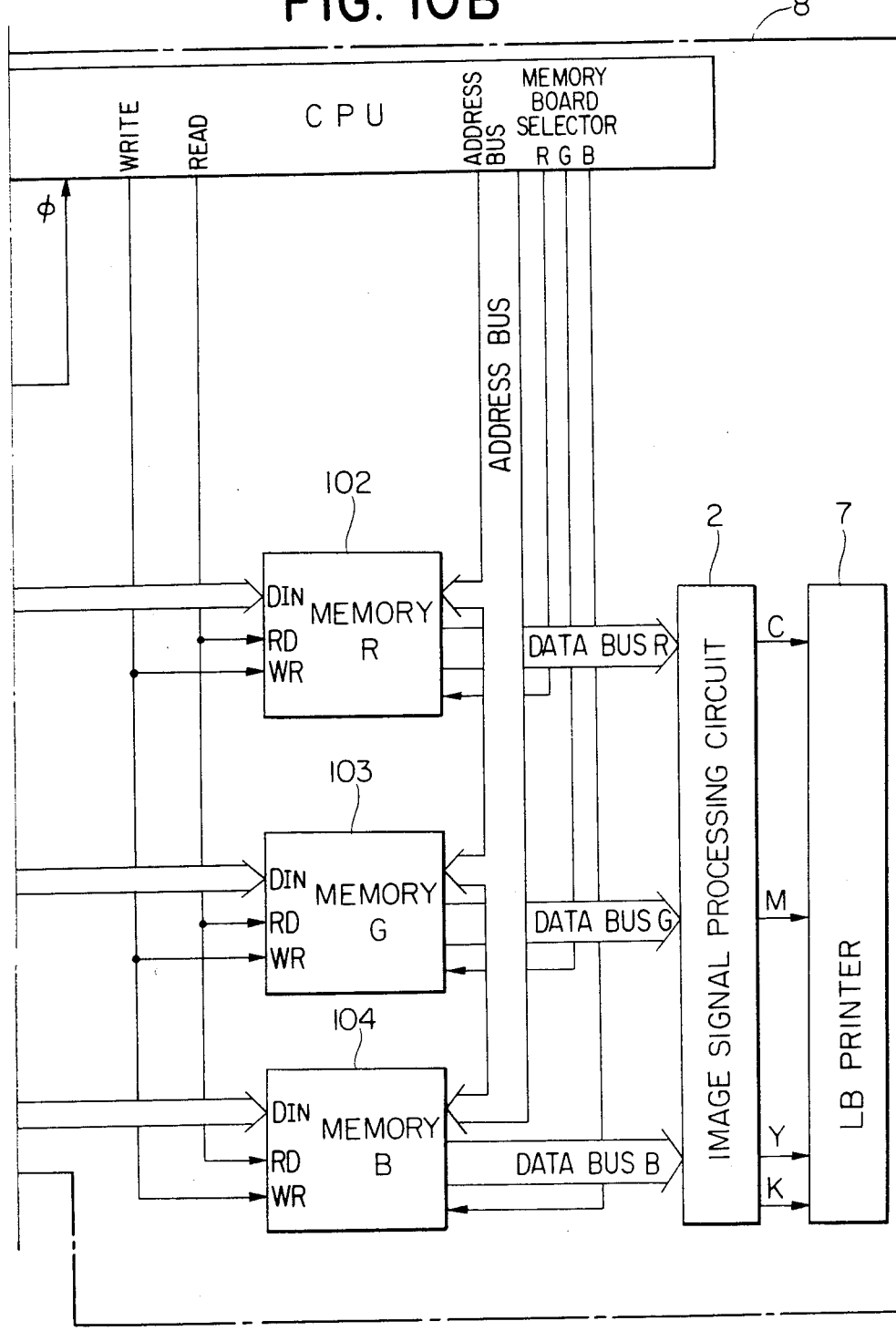

FIGS. 10A and 10B show a block diagram of a color data processing system which has a plurality of external terminal devices and reproduces a color image based on an image data signal such as a color signal from a reader contained in a printer of its own or an image data signal from the external terminal device. FIGS. 11A and 11B show a control flow chart for receiving data by the CPU 100. In a step 1 of FIG. 11A, the CPU 100 selects a selector 2 (110) by a select signal 2 to poll the external terminal devices 111–115. If a transmission request from the external terminal device is detected in a step 2, a selector 2 (110) selects the requesting terminal by a select signal 2, in a step 3. In a step 4, if the CPU is ready to receive the data, the CPU sends a READY signal to the selected terminal device from a terminal SO. In steps 5 and 6, the printer 8 receives the signal from the selected terminal device.

In the steps 2 and 7, if the transmission request is not issued from the external terminal device but the reader 116 issues a transmission (local transmission) request, the selector 2 selects the reader 116 by the select signal 2 in a step 8. In a step 9, the READY signal is sent to the reader and the printer 8 receives the signal from the reader in a step 11.

While the printer has the controller in the above embodiment, the reader 116 may have a controller so that the external data is transmitted to the printer through the reader. The data read by the reader may be transmitted to the external terminal device.

What we claim is:

1. Color image data processing apparatus comprising:
   input means including a common transmission channel and means for inputting to said common transmission channel a plurality of data signals, each data signal having a different one of a plurality of data formats in each of which a plurality of color component data are arranged during respective different periods of the data signal;
   separation means for separating the plurality of color component data from each said data signal in accordance with the format of that data signal; and
   memory means for storing the plurality of color component data separated by said separation means.

2. An apparatus according to claim 1, wherein the format of one of the data signals is an arrangement of the plurality of color component data in pixel units.

3. An apparatus according to claim 1, wherein the format of one of the data signals is an arrangement of the plurality of color component data in line units.

4. An apparatus according to claim 1, wherein the format of one of the data signals is an arrangement of the plurality of color component data in frame units.

5. An apparatus according to claim 1, further comprising:
   masking processing means for performing masking processing on the separated color component data; and
   color image forming means for forming a color image in response to the separated color component data that have been masking-processed by said masking processing means.

6. An apparatus according to claim 1, wherein said color component data include red, green, and blue data.

7. An apparatus according to claim 1, wherein said inputting means inputs a plurality of discrimination signals to said common transmission channel, each discrimination signal being associated with one of said data signals and representing the format of the associated data signal, said apparatus further comprising discrimination means for discriminating the format of a data signal in response to the associated discrimination signal.

8. Color image data processing apparatus comprising:
   input means including a common transmission channel and means for inputting a color image data signal and a discrimination signal to said common transmission channel, the data signal having one of a plurality of data formats in each of which a plurality of kinds of data in the form of color component data are arranged during respective different periods of the data signal, the plurality of data formats including arrangements of the plurality of color component data in pixel units and in line units, and said discrimination signal representing the format of the data signal;

discrimination means connected to said common transmission channel and being responsive to the discrimination signal to discriminate the format of said data signal input by said inputting means; and separation means responsive to the discrimination by said discrimination means for separating said plurality of color component data from the data signal.

9. An apparatus according to claim 8, further comprising:

masking processing means for performing masking processing on the separated color component data; and color image forming means for forming a color image in response to the separated color component data that have been masking-processed by said masking processing means.

10. An apparatus according to claim 8, wherein said color component data include red, green, and blue data.

11. An apparatus according to claim 8, further comprising memory means for storing the plurality of color component data separated from the data signal by said separation means.

12. Color image data processing apparatus comprising:

input means including a common transmission channel and means for inputting a color image data signal and a discrimination signal to said common transmission channel, the data signal having one of a plurality of data formats in each of which a plurality of kinds of data in the form of color component data are arranged during respective different periods of the data signal, the discrimination signal representing the format of the data signal, one of the plurality of data formats being an arrangement of the plurality of color component data in pixel units and another of the plurality of data formats being an arrangement of the plurality of color component data in frame units;

discrimination means connected to said common transmission channel and being responsive to the discrimination signal to discriminate the format of said data signal input by said inputting means; and separation means responsive to the discrimination by said discrimination means for separating said plurality of color component data from the data signal.

13. An apparatus according to claim 12, further comprising:

masking processing means for performing masking processing on the separated color component data; and color image forming means for forming a color image in response to the separated color component data that have been masking-processed by said masking processing means.

14. An apparatus according to claim 12, wherein said color component data include red, green, and blue data.

15. An apparatus according to claim 12, further comprising memory means for storing the plurality of kinds of color component data separated from the data signal by said separation means.

16. Color image data processing apparatus comprising:

input means including a common transmission channel and means for inputting a color image data signal and a discrimination signal to said common transmission channel, the data signal having one of a plurality of data formats in each of which a plurality kinds of data in the form of color component data are arranged during respective different periods of the data signal, the discrimination signal representing the format of the data signal, one of the plurality of data formats being an arrangement of the plurality of color component data in line units and another of the plurality of data formats being an arrangement of the plurality of color component data in frame units;

discrimination means connected to said common transmission channel and being responsive to the discrimination signal to discriminate the format of said data signal input by said inputting means; and separation means responsive to the discrimination by said discrimination means for separating said plurality kin of color component data from the data signal.

17. An apparatus according to claim 16, further comprising:

masking processing means for performing masking processing on the separated color component data; and color image forming means for forming a color image in response to the separated color component data that have been masking-processed by said masking processing means.

18. An apparatus according to claim 16, wherein said color component data include red, green, and blue data.

19. An apparatus according to claim 16, further comprising memory means for storing the plurality of color component data separated from the data signal by said separation means.

* * * * *

UNITED STATES PATENT AND TRADEMARK OFFICE
CERTIFICATE OF CORRECTION

PATENT NO. : 4,713,684
DATED : December 15, 1987
INVENTOR(S) : NAOTO KAWAMURA, ET AL.

It is certified that error appears in the above-identified patent and that said Letters Patent is hereby corrected as shown below:

COLUMN 2

Line 64, "transfer" should read --transfers--.
  Line 66, "removed)" should read --removal)--.
  Line 67, "processing" should read --processed--.

COLUMN 8

Line 21, "kinds" should read --of kinds--.
  Line 36, "kin" should be deleted.

Signed and Sealed this

Eighth Day of November, 1988

Attest:

DONALD J. QUIGG

Attesting Officer            Commissioner of Patents and Trademarks